United States Patent

Hou et al.

[11] Patent Number: 5,815,481
[45] Date of Patent: Sep. 29, 1998

[54] APPARATUS FOR TRANSVERSE IMAGE REGISTRATION OF A PHOTORECEPTOR BELT

[75] Inventors: Ssujan Hou, Webster; Lam F. Wong, Fairport, both of N.Y.

[73] Assignee: Xerox Corporation, Stamford, Conn.

[21] Appl. No.: 185,294

[22] Filed: Jan. 24, 1994

Related U.S. Application Data

[63] Continuation of Ser. No. 859,746, Mar. 30, 1992, abandoned.

[51] Int. Cl.⁶ ........................................................ G11B 3/74
[52] U.S. Cl. ................................................................ 369/97
[58] Field of Search ..................................... 358/205, 406, 358/75; 346/136, 157; 250/557, 556, 566, 570; 369/97, 125, 127

[56] References Cited

U.S. PATENT DOCUMENTS

| | | | |
|---|---|---|---|
| 3,559,568 | 2/1971 | Stanley | 101/32 |
| 3,783,293 | 1/1974 | Gold et al. | 250/548 |
| 4,146,797 | 3/1979 | Nakagawa | 250/548 |
| 4,184,080 | 1/1980 | Massey | 250/548 |
| 4,226,123 | 10/1980 | Friberg | 250/205 |
| 4,315,201 | 2/1982 | Suzuki et al. | 280/557 |
| 4,641,070 | 2/1987 | Pfizenmaier et al. | 318/640 |
| 4,745,288 | 5/1988 | Hurley et al. | 250/548 |
| 4,857,745 | 8/1989 | Gough | 250/548 |
| 4,864,631 | 9/1989 | Jensen | 382/61 |
| 5,208,796 | 5/1993 | Wang et al. | 369/97 |

*Primary Examiner*—Nabil Hindi

[57] ABSTRACT

A method and apparatus is provided for transverse registration of image exposures on photoreceptive belts subject to lateral deviation from linear travel in which targets, corresponding in location to the image areas to be exposed, are used for the detection of lateral belt displacement and to control the transverse location of exposure scan. The targets each comprise a group of three slots formed in the belt, each slot inclined by some angle θ with respect to the transverse process direction of belt travel so that the duration of time between passage of the slots with respect to a spatially fixed sensing axis will vary with lateral displacement of the belt.

4 Claims, 3 Drawing Sheets

APPARATUS FOR TRANSVERSE IMAGE REGISTRATION OF A PHOTORECEPTOR BELT

This is a continuation of application Ser. No. 07/859,746, filed Mar. 30, 1992 now abandoned.

BACKGROUND OF THE INVENTION

The present invention relates to registration of plural image exposures formed on a photoreceptor belt and, more particularly, to transverse registration of images formed by exposure to transverse line scanning on a longitudinally moving belt subject to lateral deviation from linear travel.

DESCRIPTION OF THE RELATED ART

In digital methods for providing color images by xerography, for example, each image area on a photoreceptive belt must make at least four passes relative to a transverse line scan by a modulated laser beam or a linear array of light emitting diodes and registered to within a 0.1 millimeter circle or within a tolerance of ±0.05 mm. The use of timing marks spaced longitudinally on the belt in correspondence with the image areas, coupled with available electronic sensors and associated circuitry, has enable longitudinal registration of the image areas, or registration in the direction of belt travel, acceptably within this degree of precision. Registration of image elements or "pixels" in a transverse direction, or in a direction perpendicular to the direction of belt travel, has been more difficult to attain due to manufacturing tolerances in belt width, supporting roller geometry, uneven belt stretch or a combination of such tolerances.

In the past, the problems associated with transverse or cross registration of pixels in multiple exposures of images on photoreceptive belts have been addressed either by attempts to guide the belt in a manner to avoid or at least reduce lateral shifting, or by corrective steering of the belt in response to sensed lateral deviation from true linear travel. Belt steering techniques previously employed have most commonly relied on belt edge sensors to detect lateral shifting of the belt and to control a mechanical steering mechanism for returning it to the correct line of travel. Such belt steering systems are subject to inaccuracy resulting from belt width tolerances and edge waviness and also require a mechanical steering mechanism which requires a substantial measure of belt travel and time before the electrically sensed belt shifting can be accomplished.

An improved belt steering technique is set forth in U.S. Pat. No. 5,208,796. In this patent, whose contents are hereby incorporated by reference, there is disclosed a transverse belt registration mechanism which includes the detection of target patterns which have been formed as apertures in the photoreceptor belt, each target preceding an associated image exposure frame. The targets assume a variety of patterns in that patent, but have in common the formation in the belt of at least a reference target line and a target line inclined, with respect to the direction of belt travel, so that the duration of time between passage of the target lines with respect to a spatially fixed sensing axis varied with lateral displacement of the belt. One exemplary target pattern, shown in FIG. 5 of the said patent, is to form a "Z" shaped pattern of two transverse and one inclined slot. This embodiment has been found to produce satisfactory output signals from the associated sensor assembly allowing more precise control of the image forming optical means.

One practical problem with the "Z" shaped pattern, however, is that the transverse slots, which are formed by cutting slots into the inboard or outboard end of the belt, tend to curl upwards, due to stresses produced on the slots as they are driven around the photoreceptor drive rollers, drive end, or idler rollers. The slot edges being perpendicular to the belt travel (process) direction tend to curl upwards. The upward curls result in protrusions above the belt surface, which may be caught and damaged by the sensor, which is normally located proximate to the belt surface. The curled edge also appears "wave-like" to the sensor, resulting in depth of field sensing errors. A further problem is that the "Z" shaped pattern tends to fracture or tear, due to the cyclic bending stress and concentration at the corners of the transverse slots.

It is, therefore, an object of the present invention to improve registration sensing when using a Z-shaped type of belt pattern. It has been found that if an "italic" Z-shaped pattern is formed in the belt surface in which all three slots are inclined by some predetermined angle, with respect to a transverse line, so that no edges are perpendicular to the belt travel direction, the stress associated problems are greatly reduced and the curling phenomena eliminated. More particularly, the present invention relates to an improved imaging system for forming multiple image exposure frames on a photoconductive member including:

a photoreceptor belt adapted to accommodate the formation of an integral number of image exposure frames, said belt having a plurality of target apertures formed outside of the exposure area and associated with each exposure frame respectively, detecting means associated with said target apertures for detecting changes in the lateral position of each aperture, the apertures in said belt moving through a process direction, and means for generating signals for adjusting the transverse location of said exposure frames in relation to the detected lateral position of said apertures wherein the improved apertures comprise a set of three inclined slots, each slot inclined at an angle $\theta$ with respect to a transverse line perpendicular to the process direction, each slot separated from each other by a distance S in the process direction when the belt is properly registered.

Figure 1:
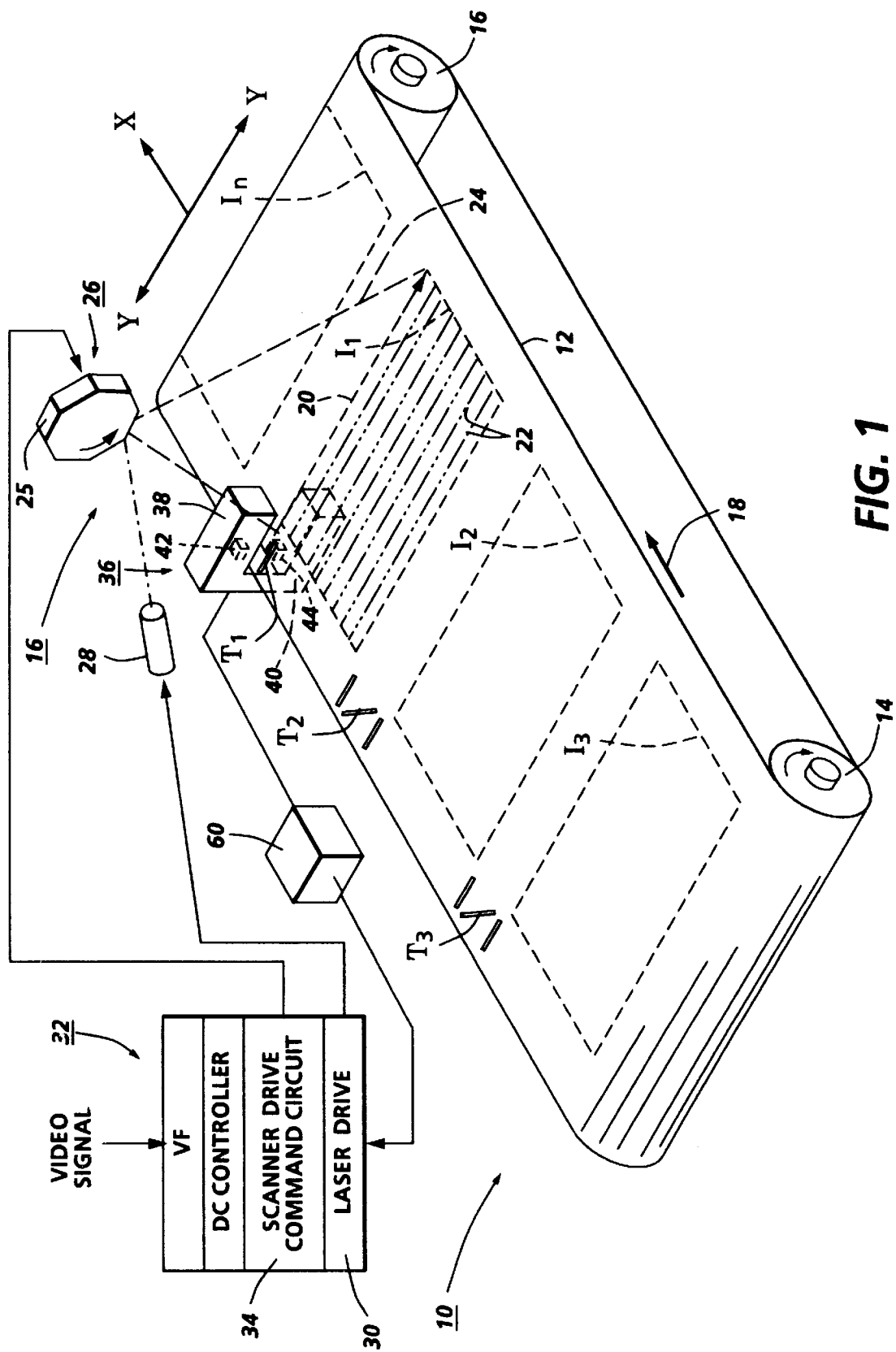
FIG. 1 is a schematic perspective view illustrating a system incorporating the invention and for providing multiple exposures on a photoreceptive belt by multiple passes of image areas on the belt in relation to a single raster output scanner.

In FIG. 1 of the drawings, an embodiment of the present invention is incorporated in a multi-pass xerographic printing system depicted schematically and designated generally by reference numeral 10. The system 10 includes a photoreceptive belt trained about guide rollers 14 and 16, at least one of which is driven to advance the belt 12 in a longitudinal (process) direction depicted by the arrow 18. The length of the belt 12 is designed to accept an integral number of spaced image areas $I_1$–$I_n$ represented by dashed line rectangles in FIG. 1. As each of the image areas $I_1$–$I_n$ reaches a transverse line of scan, represented by a dashed arrow 20, it is progressively exposed on closely spaced transverse raster lines 22 shown with exaggerated longitudinal spacing on the image area $I_1$ in FIG. 1.

In the embodiment depicted in FIG. 1, the line 20 is scanned by a ROS (raster output scanner) so that a modulated laser beam 24 is reflected to the line 20 by successive facets 25 on a rotatable polygon-shaped mirror 26. The beam 24 is emitted by a laser device 28 such as a laser diode, operated by a laser drive module 30 forming part of a control processor generally designated by the reference numeral 32. The processor 32 includes other circuit or logic modules indicated by legends in FIG. 1 and includes a scanner drive command circuit 34 by which operation of a motor (not shown) for rotating the polygon mirror 26 is controlled.

In the operation of the system 10, as thus far described, the processor 32 responds to a video signal to expose each raster line 22 to a linear segment of the video signal image. In xerographic color systems, each image area $I_1$–$I_n$, must be exposed in the same manner to four successive exposures, one for each of the three basic colors and black. In a multi-pass system such as the system 10, where only one raster output scanner or head is used, complete exposure of each image area requires four revolutions of the belt 12. As is known in the art, a single pass system would expose each image area successively by four raster output scanners each including its own polygon mirror. Continuing with the description of FIG. 1, the image areas, $I_1$–$I_n$ are successively exposed on successive raster lines 22 as each raster line registers with a transverse scan line 20 as a result of longitudinal movement of belt 12.

It is to be noted that the length of the transverse scan line 20 or transverse scan lines 20a–20d is longer than the transverse dimension of the image areas I. Scan line length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module 30. Thus, the active portion of each transverse scan line may be shifted in a transverse direction by control of the laser drive module 30 and the transverse position of the exposed raster lines 22, and image areas $I_1$–$I_n$ shifted in relation to the belt 12.

In accordance with the present invention, signals indicating deviation of belt travel from a straight line are developed and used to determine the precise transverse location of the first of successive image exposures in relation to the photoreceptive belt and to adjust the active portion of the transverse scan line 20 for each succeeding image as needed to assure precise longitudinal alignment or transverse registration of the succeeding images with the first image irrespective of the lateral position of the belt during exposure of the images. This operation is achieved by the provision of "italicized" targets $T_1$–$T_n$, to be described in more detail below with reference to FIGS. 2 and 3. These targets are located along a marginal edge of the belt 12, aligned in a longitudinal direction, and are spaced to be located slightly ahead of each image area $I_1$–$I_n$ or upstream from each such area in the context of belt travel. A single sensor 36 is located to be aligned with targets $T_1$–$T_n$.

As shown in FIG. 1, the sensor 36 has a bifurcated or horseshoe configuration to establish upper and lower legs 38 and 40, respectively, adapted to be positioned about the marginal edge of the belt 12 on which the targets $T_1$–$T_n$ are located without interference with longitudinal belt travel. The upper leg 38 supports a light source, such as a light emitting diode 42, whereas the lower leg 40 supports a light detector such as a photodiode 44, conventionally included in circuitry (not shown) by which a voltage signal is developed in response to light seen by the photodiode. The light emitting and light detecting diodes are aligned on a common optical sensing axis.

Figure 2:
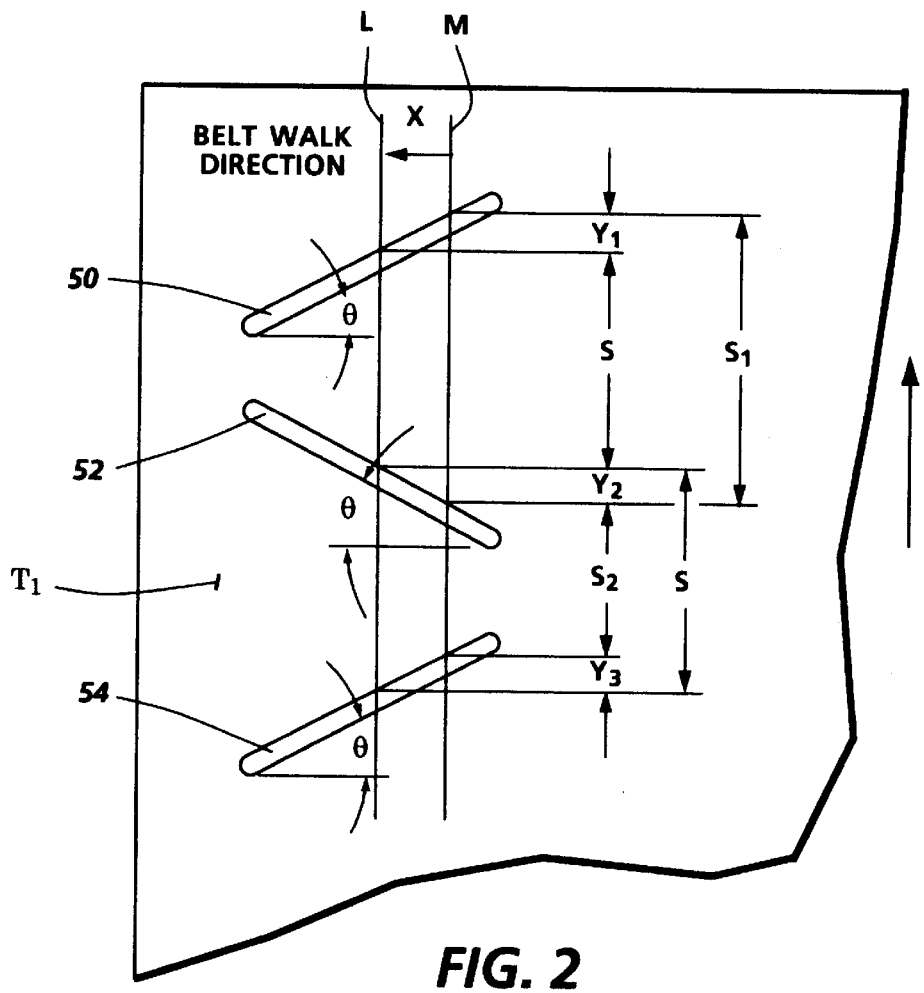
FIG. 2 is an illustration of a target pattern in accordance with the present invention.

Referring now to FIG. 2, there is shown one of the targets $T_1$ from FIG. 1 in an enlarged view. The target is formed by three aperture slots 50, 52, 54, cut or otherwise formed in belt 12. Each aperture is formed at some angle θ with respect to a line perpendicular to the direction of travel. The ends of each slot are preferable rounded. Thus, leading slot 50, inclined at an angle θ, is spaced from trailing inclined slot 54 by a third inclined slot 52. Light from the light emitting diode 42 in sensor 36 is then intercepted by the leading edge of the three slots. The points at which each slot is detected and sensed by photodiode 44 is translated into information which establishes transverse direction. The sensing axis will have a line L as the target when belt 12 is centered. The detection points between slots 50, 52, and slots 52 and 54 are separated by a distance S. For illustrative purposes, if the belt shifts to the left in reference to a center position L, the direction of travel, a new line M will be formed. Obviously, the belt shift could take place to the right as well or to other locations in between. For the example given, if the belt has shifted to the left a distance X, the leading edge of each slot will be detected at a path further to the right along axis M.

The distance between each of the detected points now changes: $S_1$ consists of original distance S plus distances $Y_1$, $Y_2$, while $S_2$ consists of original distance S minus distances $Y_2$, $Y_3$. Distances $Y_1$, $Y_2$, and $Y_3$ are related by the following equations: $Y_1=X\tan(\theta)$; $Y_2=X\tan(\theta)$; $Y_3=X\tan(\theta)$. It can be shown that the distance X is defined by the equation:

$$X = \frac{S_1 - S_2}{4\tan\theta} \quad (1)$$

where $S_1=S+Y_1+Y_2$ or $$S_1=S+2X\tan(\theta) \quad (2)$$

$S_2=S-Y_2-Y_3$ or $$S_2=S-2X\tan(\theta) \quad (3)$$

Figure 3:
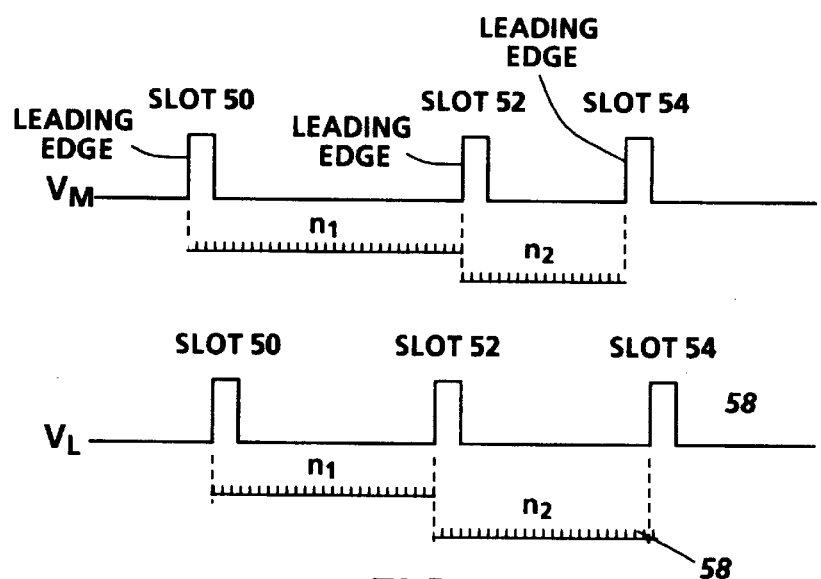
FIG. 3 shows the voltage waveform signals produced by the pattern shown in FIG. 2 and the manner by which said signals are converted to a measure of lateral displacement.

FIG. 3 shows two voltage signals originated by the photodiode 44 of sensor 36 after level sensing and squaring. The two signals are designated $V_L$, $V_M$, and correspond directly to the voltage signals developed by the photodiode 44 when the target T is positioned in relation to the respective trace lines L and M. The voltage signals are used to control an encoder clock pulse counter 58, depicted schematically in FIG. 3, by a series of parallel lines representing clock pulse increments. In practice, the counter 58 is included as a component of the control processor 32 (FIG. 1).

Thus in FIG. 3, assuming that the target T is centered with respect to the optical sensing axis common to diodes 42, 44 of sensor 36, the sensing axis will lie on the trace line L during movement of the target T past the sensor. As each slot 50, 52, 54 passes the sensing axis, photodiode 44 generates an output waveform signal, the waveform separated in space by a value which can be correlated to the separation distance S between each slot. When the sensed axis shifts to the M axis (belt has walked to the left) a distance X to the right, the output voltages generated by the sensor are separated by a time interval which corresponds to the distances $Y_1$, $Y_2$, $Y_3$. The output signals are operated upon in a timing/computation circuit 60 which is adapted to perform the mathematical operations to solve for X in equation 1. The counter 58 generates clock pulses which have the following relationship to slots 50, 52, and 54. A first number of encoder pulses $n_1$, which will be gated by the leading edges of slots 50, 52. A second number of encoder pulses $n_2$ will be gated by the leading edge of slots 52 and 54. If the encoder resolution C is equal to belt speed/encoder frequency (mm/pulses), the following relationships exist:

$$n_1 \cdot C = S_1 = S + 2X \tan(\theta) \text{ and}$$

$$n_2 \cdot C = S_2 = S - 2X \tan(\theta)$$

After solving for X in equation 1, a correction voltage is sent in a feedback loop to the laser driver 30 (FIG. 1), to adjust the start of scan and provide appropriate registration for the new, lateral position of the belt.

Figure 4A:
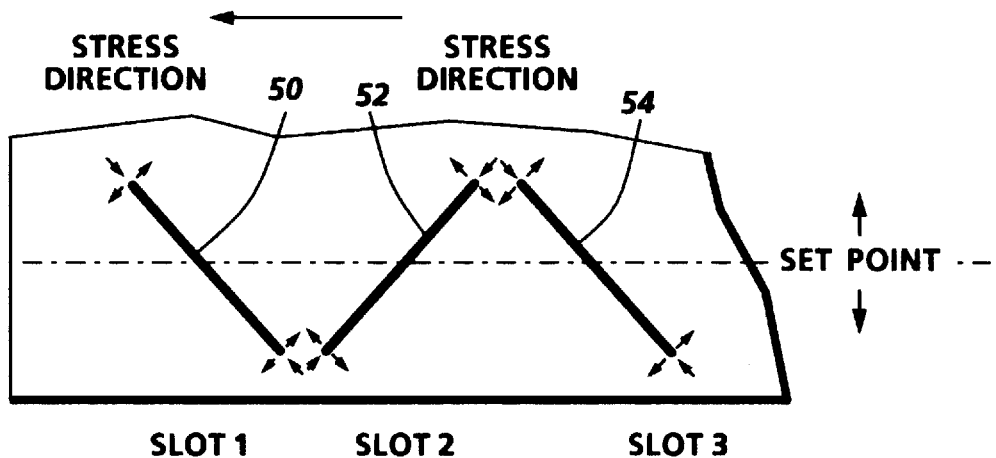
FIGS. 4A and 4B show the stress forces operating on the target pattern of FIG. 2 compared with the stress forces operating on prior art target patterns.
Figure 4B:
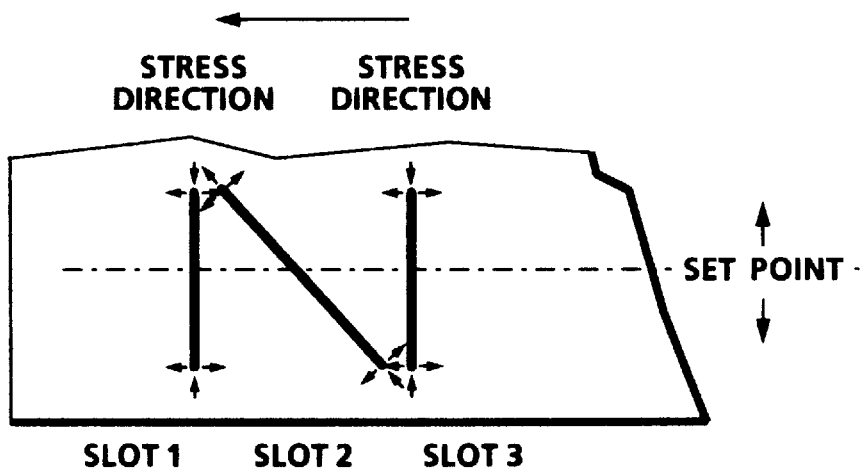

FIG. 4-*a* is a diagram of the stresses which the italicized Z-shaped targets of the present invention are subject to as they pass around the photoreceptor belt rolls 14, 16. Because of the inclination of each of the slots, the stresses at the corners of the slots are reduced by a factor of two when $\theta=45°$. This represents a substantial stress reduction from the prior art, where the slots were perpendicular to the process direction, as shown in FIG. 4-*b*.

While the invention has been described with reference to the structures disclosed, it is not confined to the details set forth, but is intended to cover such modifications or changes as they come within the scope of the following claims.

What is claimed is:

1. An improved imaging system for forming multiple image exposure frames on a photoconductive member including:

a photoreceptor belt adapted to accommodate the formation of an integral number of image exposure frames, said belt having a plurality of target apertures formed outside of the exposure area and associated with each exposure frame respectively, detecting means associated with said target apertures for detecting changes in the lateral position of each aperture, the apertures in said belt moving through a process direction, and means for generating signals for adjusting the transverse location of said exposure frames in relation to the detected lateral position of said apertures wherein the improved apertures comprise a set of three inclined slots, each slot alternately and differently inclined with respect to each other at an angle $\theta$ which is greater than 0° with respect to a transverse line perpendicular to the process direction, each slot separated from each other by a distance S in the process direction when the belt is properly registered.

2. The system of claim 1 wherein said belt has a lateral deviation of X, X defined by the equation:

$$X = \frac{S_1 - S_2}{(4 \tan\theta)}$$

where $S_1 = S + 2X \tan(\theta)$ and $S_2 = S - 2X \tan(\theta)$

3. The system of claim 2 further including an encoder clock pulse counter which is controlled by said detecting means, said encounter counter producing a first set of clock pulse increments $n_1$ representing the increments between sensing the first two of the inclined slots and a second set of clock pulse increments $n_2$ representing the increments between the last two of the inclined slots and wherein:

$$S_1 = S + 2X \tan(\theta) = n_1 \cdot C$$

$$S_2 = S - 2X \tan(\theta) = n_2 \cdot C$$

where C is the resolution of the encoder clock pulse counter.

4. The system of claim 1 wherein $\theta=45°$.

* * * * *